(12) United States Patent
Desai et al.

(10) Patent No.: US 12,376,140 B2
(45) Date of Patent: Jul. 29, 2025

(54) MULTI-LINK DEVICE COHESIVE INTER-BAND CHANNELIZATION FOR ACCESS POINTS

(71) Applicant: Cisco Technology, Inc., San Jose, CA (US)

(72) Inventors: Vishal S. Desai, San Jose, CA (US); Pooya Monajemi, San Jose, CA (US); Santosh B. Kulkarni, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 421 days.

(21) Appl. No.: 18/063,594

(22) Filed: Dec. 8, 2022

(65) Prior Publication Data

US 2024/0015775 A1 Jan. 11, 2024

Related U.S. Application Data

(60) Provisional application No. 63/368,027, filed on Jul. 8, 2022.

(51) Int. Cl.
*H04W 4/00* (2018.01)
*H04W 72/541* (2023.01)

(52) U.S. Cl.
CPC .............................. *H04W 72/541* (2023.01)

(58) Field of Classification Search
CPC ............................ H04W 72/541; H04W 28/16
See application file for complete search history.

(56) References Cited

U.S. PATENT DOCUMENTS

| | | | |
|---|---|---|---|
| 11,336,487 B1 | 5/2022 | Dakshinkar et al. | |
| 2017/0311325 A1 | 10/2017 | Cariou et al. | |
| 2021/0321473 A1 | 10/2021 | Monajemi et al. | |
| 2022/0225200 A1* | 7/2022 | Smith | H04L 1/1614 |
| 2023/0333241 A1* | 10/2023 | Zhang | G01S 13/876 |

FOREIGN PATENT DOCUMENTS

| | | | | |
|---|---|---|---|---|
| CN | 106464668 A * | 2/2017 | ........ | H04W 52/0206 |
| WO | 2022108838 A1 | 5/2022 | | |
| WO | 2022122151 A1 | 6/2022 | | |
| WO | WO-2024196811 A1 * | 9/2024 | ........... | H04B 1/0475 |

* cited by examiner

*Primary Examiner* — Thai Dinh Hoang
(74) *Attorney, Agent, or Firm* — Patterson + Sheridan, LLP

(57) ABSTRACT

Embodiments herein describe techniques for performing dynamic channel assignment for MLD stations using MLD distributions associated with access points (APs). The embodiments herein include techniques for considering inter-frequency isolation (also referred to as inter-spectrum isolation) as well as intra-frequency contention when assigning channels to MLDs.

20 Claims, 6 Drawing Sheets

MULTI-LINK DEVICE COHESIVE INTER-BAND CHANNELIZATION FOR ACCESS POINTS

CROSS-REFERENCE TO RELATED APPLICATIONS

This application claims benefit of co-pending U.S. provisional patent application Ser. No. 63/368,027 filed Jul. 8, 2022. The aforementioned related patent application is herein incorporated by reference in its entirety.

TECHNICAL FIELD

Embodiments presented in this disclosure generally relate to performing dynamic channel assignment for multi-link devices (MLDs).

BACKGROUND

Under the IEEE 802.11ax standard, a Wi-Fi access point (AP) communicates with a station (e.g., a client device) using one of the 2.4 GHz, 5 GHz, or 6 GHz frequency bands at a time. Each of these frequency bands includes a plurality of smaller frequency bands, or channels.

The AP can assign a radio to a given channel to establish a communication link between the AP and the station on the channel. The AP and the station can then transmit and receive signals across the channel. A multi-link device (MLD) is a station that can simultaneously send and receive data across different frequency bands and channels. MLDs can be classified into multi-link multi radio (MLMR) and multi-Link single radio (MLSR) categories. A MLMR MLD can operate in a simultaneous transmission and reception (STR) mode and a non-STR mode. In STR mode, the MLD can perform STR in communications with the multi-link AP, which comprises simultaneously transmitting and receiving signals on multiple channels which can be in the same frequency band or different frequency bands. In non-STR mode, the device can communicate with the multi-link AP on one frequency band at a time (like a non-MLD or legacy station).

Based on MLD capabilities, a MLD vendor typically enforces frequency separation between the two radios of MLMR MLDs. Frequency separation prevents receiver saturation or interference between the two radios that offer either STR or non-STR functions. Similarly, MLSR MLDs may also enforce avoidance on certain frequencies as part of a band-pas filter's roll off factor when switching between frequency bands. However, current dynamic channel assignment algorithms for MLDs does not consider inter-frequency band inference.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
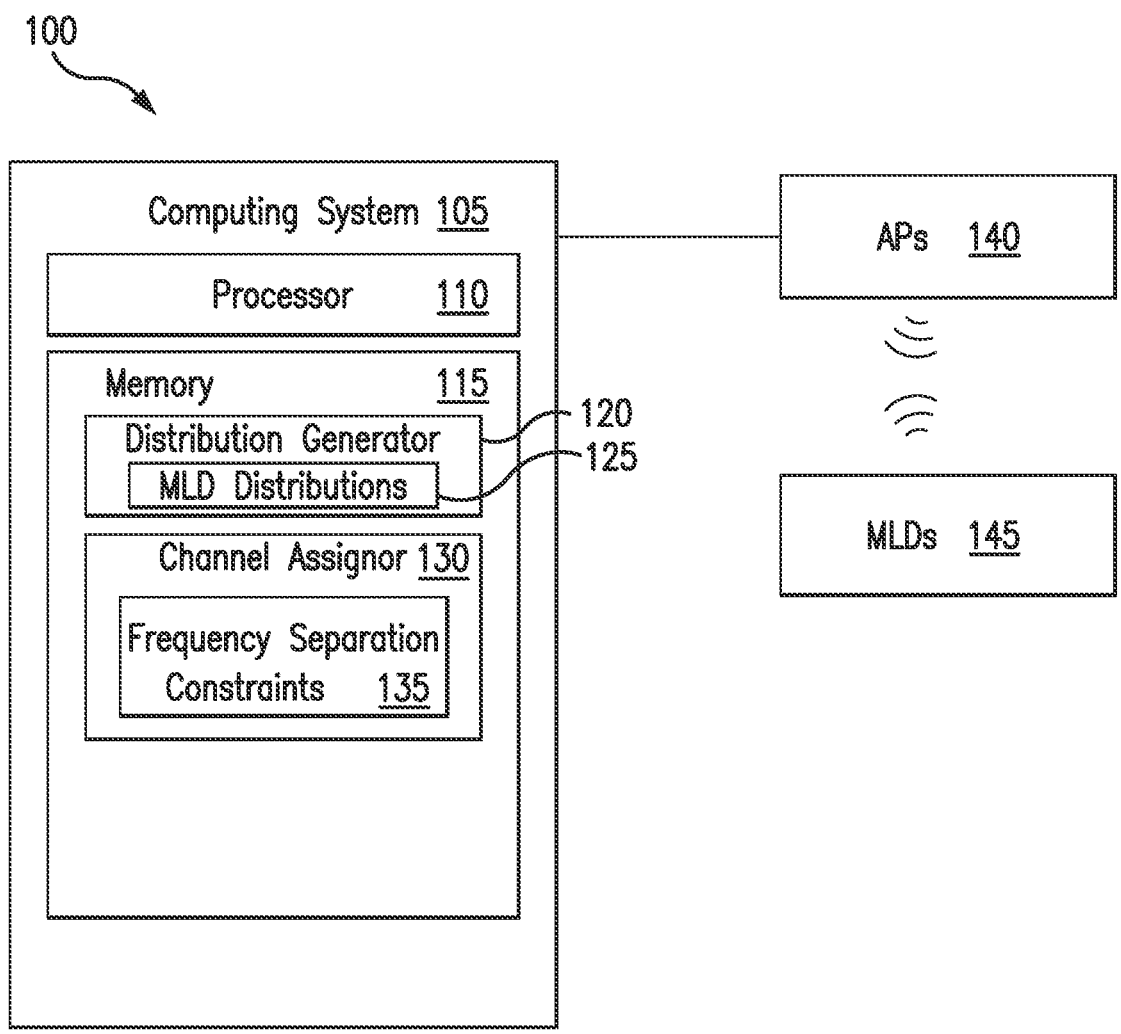
FIG. 1 illustrates a system for performing channel assignment for MLDs, according to one embodiment.

One embodiment presented in this disclosure is a system that includes a processor and memory configured to store a program that performs an operation. The operation includes identifying types of a plurality of multi-link devices (MLDs) associated with a plurality of access points (APs); generating, for each of the plurality of APs, a plurality of MLD distributions for multiple frequency bands supported by the AP where each of the plurality of MLD distributions indicate a type of each of the plurality of MLDs associated with a respective one of the plurality of APs on a respective frequency band; and assigning channels to the plurality of MLDs for a candidate AP based on the plurality of MLD distributions and a frequency separation constraint to mitigate inter-band frequency contention.

One embodiment presented in this disclosure is a system that includes a processor and memory configured to store a program that performs an operation. The operation includes identifying types of a plurality of multi-link devices (MLDs) associated with a plurality of access points (APs); generating, for each of the plurality of APs, an MLD distribution for a frequency band where each of the MLD distributions indicates a type of each of the plurality of MLDs associated with a respective one of the plurality of APs on the frequency band; and assigning channels to the plurality of MLDs in the frequency band based on the MLD distributions of the plurality of APs to satisfy intra-band spectrum isolation values in the frequency band.

One embodiment presented in this disclosure is a system that includes a processor and memory configured to store a program that performs an operation. The operation includes identifying multi-band channel bonding (MBCB) and multi-band aggregation (MBA) devices associated with a plurality of access points (APs), generating, for each of the plurality of APs, MBCB and MBA distributions, where the MBCB and MBA distributions indicate a number of the MBCB and MBA devices associated with a respective one of the plurality of APs, and assigning channels to the MBCB and MBA devices based on the MBCB and MBA distributions to satisfy a frequency separation constraint for channel bonding.

Example Embodiments

Embodiments herein describe techniques for performing dynamic channel assignment for MLD stations using MLD distributions associated with access points (APs). As mentioned above, an MLD can use frequency separation (e.g., from 100 MHz to 250 MHz) to provide isolation between the radios. Further, make-before-break roaming (MBBR) is the concept that a moving client device initiates communication with the next AP while still in contact with the current AP, thereby never losing connectivity. An MLD station that is in an MBBR mode may choose to, for example, maintain a 5 GHz link with on AP and a 6 GHz link with another AP while it moves in the space between these APs. The embodiments herein include techniques for considering inter-frequency band (also referred to as inter-spectrum) links when assigning channels to MLDs.

FIG. 1 illustrates a system 100 for performing channel assignment for MLDs 145, according to one embodiment. As shown, the system 100 includes a computing system 105, APs 140, and MLDs 145. In one embodiment, the computing system 105 may be part of a radio resource management system. Moreover, the computing system 105 may be in a datacenter, server, part of a WLAN controller, our could be part of one of the APs 140.

The computing system 105 includes a processor 110 that can represent any number of processing elements which each can include any number of processing cores. The computing system 105 also includes memory 115 that can include volatile memory, nonvolatile memory, and combinations thereof. Further, the memory 115 can be a mix of local and external memory.

The memory 115 stores a distribution generator 120 and channel assignor 130, which may be software modules or applications. The distribution generator 120 generates MLD distributions 125 for the APs 140. In one embodiment, the distribution generator 120 creates a MLD distribution for each frequency band used by the AP 140 (e.g., a first MLD distribution for 2.4 GHz, a second MLD distribution for 5 GHz, a third MLD distribution for 6 GHz, etc.). For example, a first MLD distribution 125 may indicate that 50% of the stations associated with (i.e., connected to) a first AP in the 2.4 GHz frequency band are MLMR MLDs, 30% are MLSR MLDs, and 20% are non-MLD stations (i.e., legacy stations). A second MLD distribution 125 may indicate that 70% of the stations associated with the first AP in the 6 GHz frequency band are MLMR MLDs, 25% are MLSR MLDs, and 5% are non-MLD stations. A third MLD distribution 125 may indicate the MLDs in the 6 GHz frequency band of the first AP, and so forth.

In one embodiment, the APs 140 classify the MLDs 145 to learn the different types of MLDs associated with the APs 140. The APs 140 can then forward this information to the distribution generator 120. Further as discussed in more detail below, the distribution generator 120 can use historical data to generate the MLD distributions 125. For example, the MLD distributions 125 may represent an average (or even a prediction) of the MLDs associated with a particular AP 140.

The channel assignor 130 uses frequency separation constraints 135 and the MLD distributions 125 to assign channels to the MLDs 145 to use when communicating with the APs 140. For example, for MLMR MLDs, the frequency separation constraints 135 can be a minimum frequency separation requirement between the channels used by the two (or more) radios in the MLDs. For MLSR MLDs, the frequency separation constraints 135 can be the band-pas filter's roll off factor which indicates certain channels that should not be used.

In addition to MLMR and MLSR MLDs, the embodiments herein also can assign channels to multi-band channel bonding (MBCB) and multi-band aggregation (MBA) stations which are different categories of STR MLD devices. MBCB and MBA MLDs are distinguished by the type of PHY protocol data unit (PPDU) used when bonding channels from different frequency bands. MBCB and MBA MLDs can also have frequency separation constraints 135 to support multi-band channel bonding, whether in the same frequency band or between two frequency bands.

Figure 2:
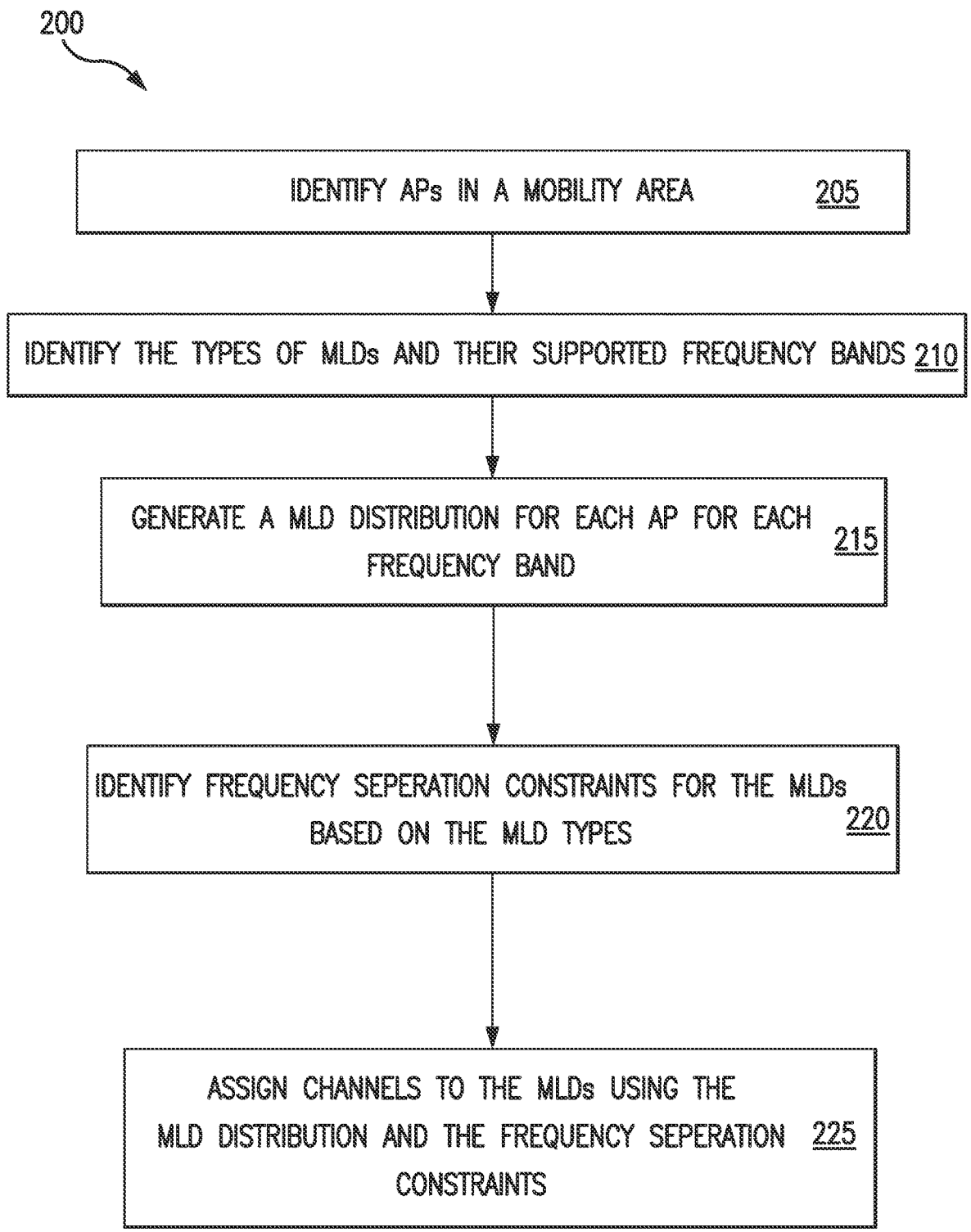
FIG. 2 is a flowchart for performing channel assignment for MLDs, according to one embodiment.

FIG. 2 is a flowchart of a method 200 for performing channel assignment for MLDs, according to one embodiment. At block 205, the distribution generator (e.g., the distribution generator 120 in FIG. 1) identifies APs in a mobility area where client devices (e.g., stations) may roam between the APs. For example, the mobility area may be a building, a floor of a building, store, campus, etc. The APs may be coupled to a controller (e.g., a WLAN controller) or multiple controllers.

In one embodiment, the APs in the mobility area is subdivided into radio frequency (RF) constellations (referred to as sub-RF constellations). For example, AP neighbor information can be gathered to determine which APs are neighbors. For instance, the APs in each floor of a multi-story building may be divided into respective sub-RF constellations, or APs in each building of a campus may be divided into respective sub-RF constellations using the neighbor information. However, in other embodiments, a system administrator may designate the sub-RF constellations. In general, a sub-RF constellation can be any grouping of APs that have radios whose coverage areas may overlap.

In one embodiment, the channel assignor assigns mobility scores to the APs in the mobility area or the sub-RF constellations. These mobility scores can be based on historical roaming patterns such as how often stations roam to, and away from, each AP. A higher mobility score may indicate the AP has client devices that roam in and out more frequently than APs with lower mobility scores. The mobility scores and the roaming history can be used to generate the MLD distributions as discussed below.

At block 210, the distribution generator identifies the types of MLDs and the frequency bands they support. In one embodiment, the APs in the mobility area (or in the sub-RF constellation) perform MLD classification to identify the type of MLDs associated with the APs and the frequency bands (or spectrums) supported by those MLDs. For example, AP 1 may determine it has (1) a MLMR MLD connected to it operating in the STR mode supporting 5 GHz and 6 GHz, (2) a MLMR MLD supporting MBCB, (3) a MLMR MLD operating in the non-STR mode supporting 2.4 GHz and 5 GHz, and (4) an enhanced MLSR (eMLSR) MLD that supports 5 GHz and 6 GHz.

Each AP can perform MLD classification information and then forward this information to the distribution generator. As mentioned above, the distribution generator can be hosted in one of the APs, a WLAN controller, a server, or a data center (e.g., a cloud computing environment).

Figure 3:
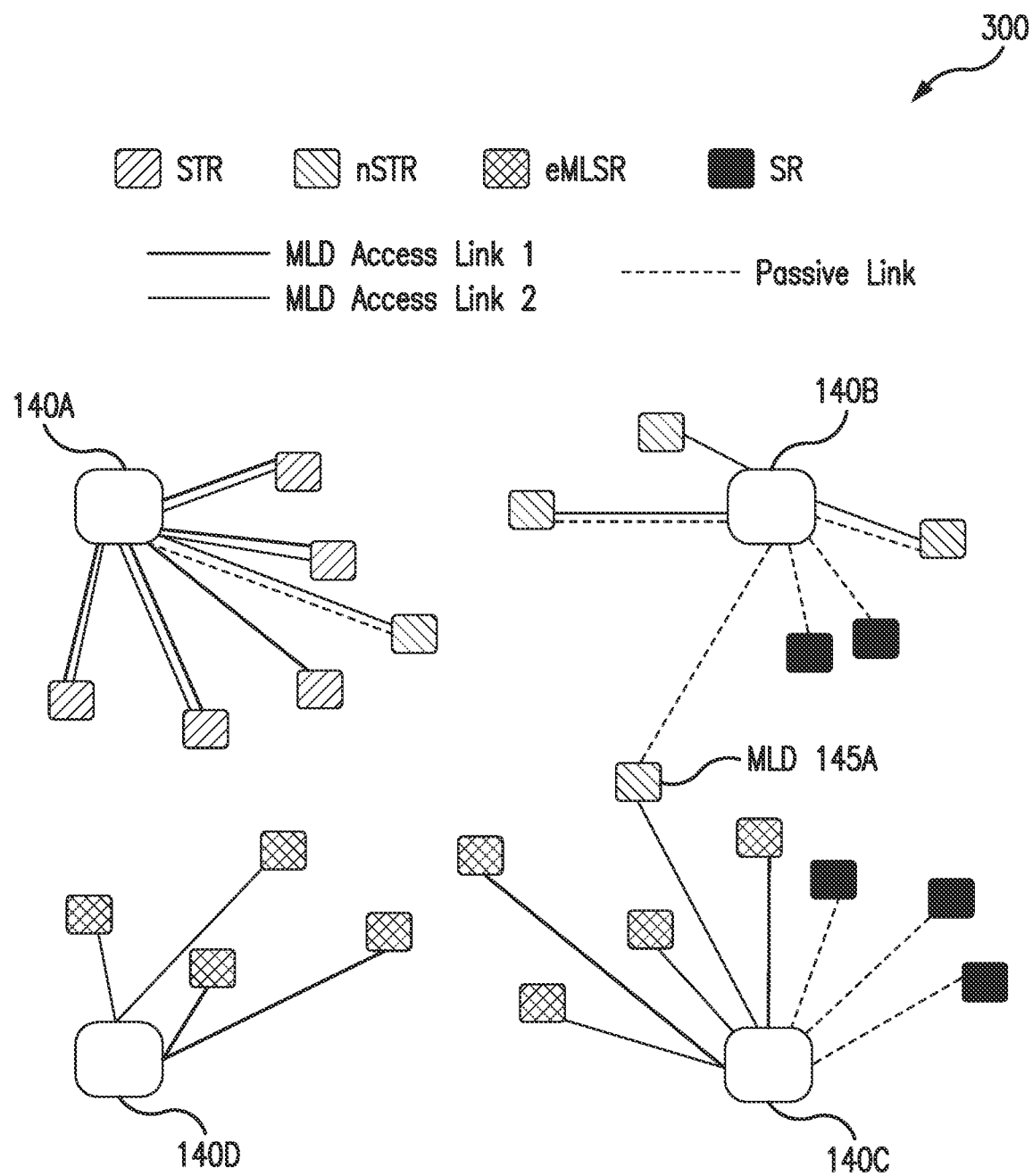
FIG. 3 illustrates an AP constellation with different types of MLDs, according to one embodiment.

FIG. 3 illustrates an AP constellation 300 with different types of MLDs, according to one embodiment. The constellation 300 includes APs 140A-D. The APs can perform MLD classification to discover the types of MLDs coupled to the APs 140 as shown.

Notably, when both the links of the MLDs are connected to the same APs, then channel assignment is easier since the AP 140 can ensure, without needing coordination from a resource management system, that a frequency separation constraint is satisfied. However, as shown by the MLD station 145A when roaming, the station may have one link to a first AP (AP 140B) and a second link to a second AP (AP 140C). In this example, the dynamic channel assignment is more difficult since two APs are involved. For example, the first AP may assign a channel to the MLD station 145A in one frequency band (e.g., the UNII-3: 5825 MHz channel in the 5 GHz band) that does not have sufficient frequency isolation from a channel the second AP assigns to the MLD station 145A in a second frequency band (e.g., the UNII-5: 5925 MHz in the 6 GHz band). Thus, the embodiments herein can be used to coordinate channel assignments across frequency bands and across APs to ensure frequency separation constraints are satisfied as the MLDs roam.

Returning to FIG. 2, at block 215, the distribution generator generates a MLD distribution for each AP for each frequency band. That is, the distribution generator uses the types of MLDs and their supported frequency bands to identify the distribution of MLDs in each frequency band supported by the APs. In one embodiment, the MLD distributions may also indicate the number of non-MLD stations (legacy stations) associated with the AP. For example, for AP 1, a first MLD distribution may indicate that 50% of the stations in its 2.4 GHz frequency band are MLMR MLDs, 30% are MLSR MLDs, and 20% are non-MLD stations (i.e., legacy stations). A second MLD distribution for the 5 GHz frequency band of AP 1 may indicate that 70% of the stations are MLMR MLDs, 25% are MLSR MLDs, and 5% are non-MLD stations. A third MLD distribution for the 6 GHz frequency band of AP 1 may indicate 40% of the stations are MLMR MLDs, 30% of the stations are MLSR MLDs, and 30% are MBCB/MBA MLDs. The distribution generator can generate the MLD distributions for each AP in the mobility area or the sub-RF constellations.

While in one embodiment the MLD distributions may be a current snapshot of the MLDs (and non-MLDs) associated with the APs, in other embodiments, the distribution generator may consider the roaming history of the APs to generate average MLD distributions for the APs which consider the MLDs connected to the APs over a period of time.

In another embodiment, the MLD distributions are predictive MLD distributions which predict what the distribution of MLDs at the APs will be in the future. For example, the distribution generator may evaluate the roaming history to then predict what the MLD distribution at the APs will be at a future time. For example, if the roaming history indicates there are significant more MLDs associated with an AP Monday mornings because of, for example, an all hands meeting each week for a business, the distribution generator may recognize this pattern and generate MLD distributions that anticipate this increase in MLDs connecting to the AP.

At block 220, the channel assignor (e.g., the channel assignor 130 in FIG. 1) identifies frequency separation constraints for the MLDs based on the types of the MLDs. For example, the MLMR MLDs have a minimum frequency separation requirement between the channels used by the two (or more) radios in the MLDs. Moreover, the minimum frequency separation requirement can vary depending on the chipset or vendor of the MLD (i.e., some chipsets may have smaller minimum frequency separation requirements than others). For MLSR MLDs, the frequency separation constraints can be the band-pas filter's roll off factor which indicates certain channels that should not be used. For MBCB and MBA MLDs, the frequency constraint is related to bonding channels from different frequency bands or the same frequency band. Thus, by identifying the MLD type at block 210, the channel assignor can identify a frequency isolation constraint for each MLD type, as well as for each MLD of a particular type (assuming their constraints vary, as is the case with the minimum frequency isolation requirements for MLMR MLDs).

At block 225, the channel assignor assigns channels to the MLDs using the MLD distributions and the frequency separation constraints to mitigate inter-band frequency contention. Thus, when a MLD roams between APs and may have links to two different APs as shown in FIG. 3, the frequency isolation requirements can still be met. Moreover, the embodiments herein can also be applied to intra-band channel assignments for MLDs. Inter-band and intra-band channel assignment of MLDs is discussed in more detail in FIG. 4.

Figure 4:
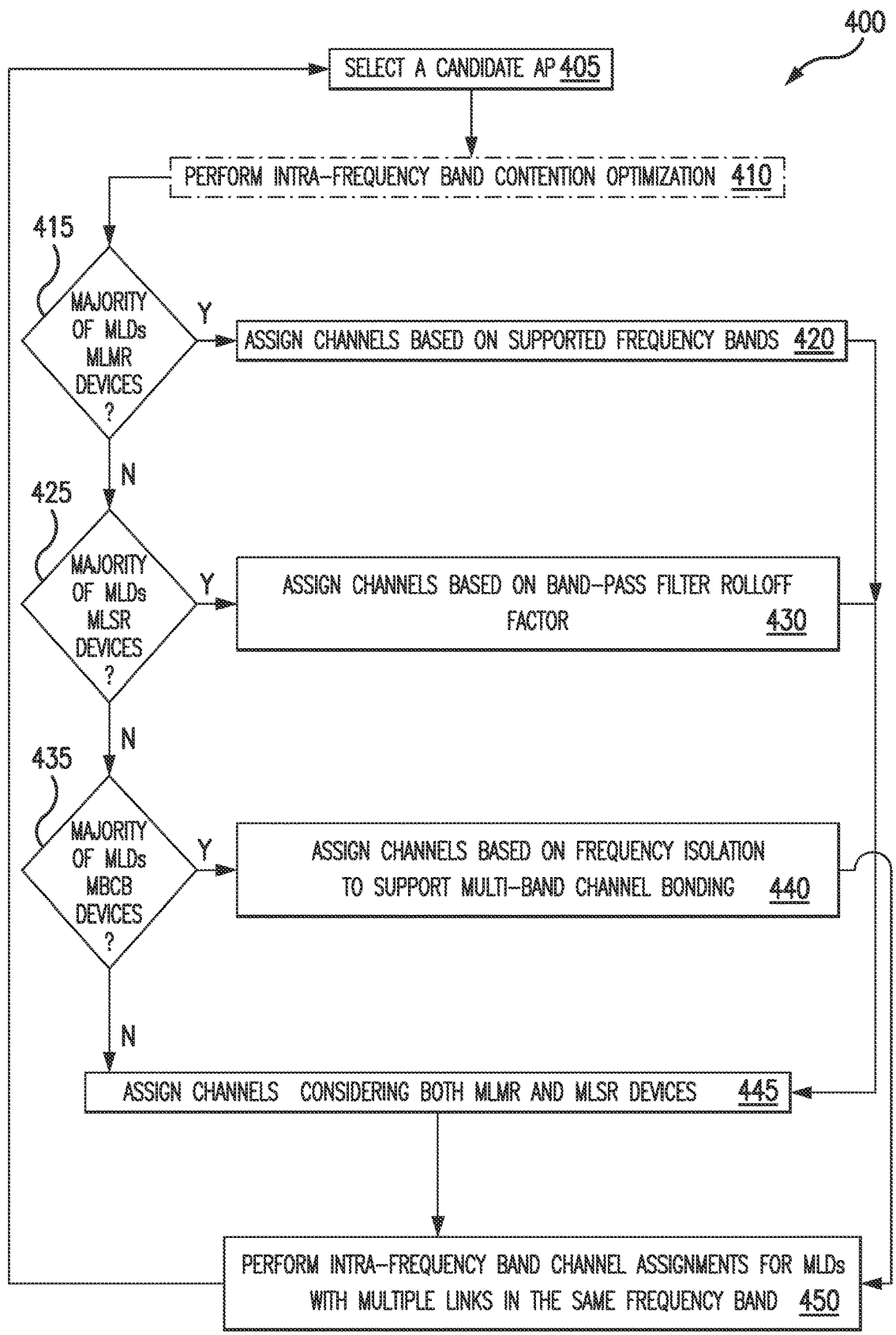
FIG. 4 is a flowchart for performing channel assignment for MLDs, according to one embodiment.

FIG. 4 is a flowchart of a method 400 for performing channel assignment for MLDs, according to one embodiment. For ease of explanation, various blocks in the method 400 are discussed in tandem with FIGS. 5-7.

At block 405, the channel assignor selects a candidate AP. In one embodiment, the method 400 is repeated for each AP in a sub-RF constellation or mobility area. In another embodiment, the mobility scores discussed in the method 200 may be used to determine which APs are evaluated. For example, an AP may have to have a mobility score over a threshold before it is evaluated in method 400.

Figure 5:
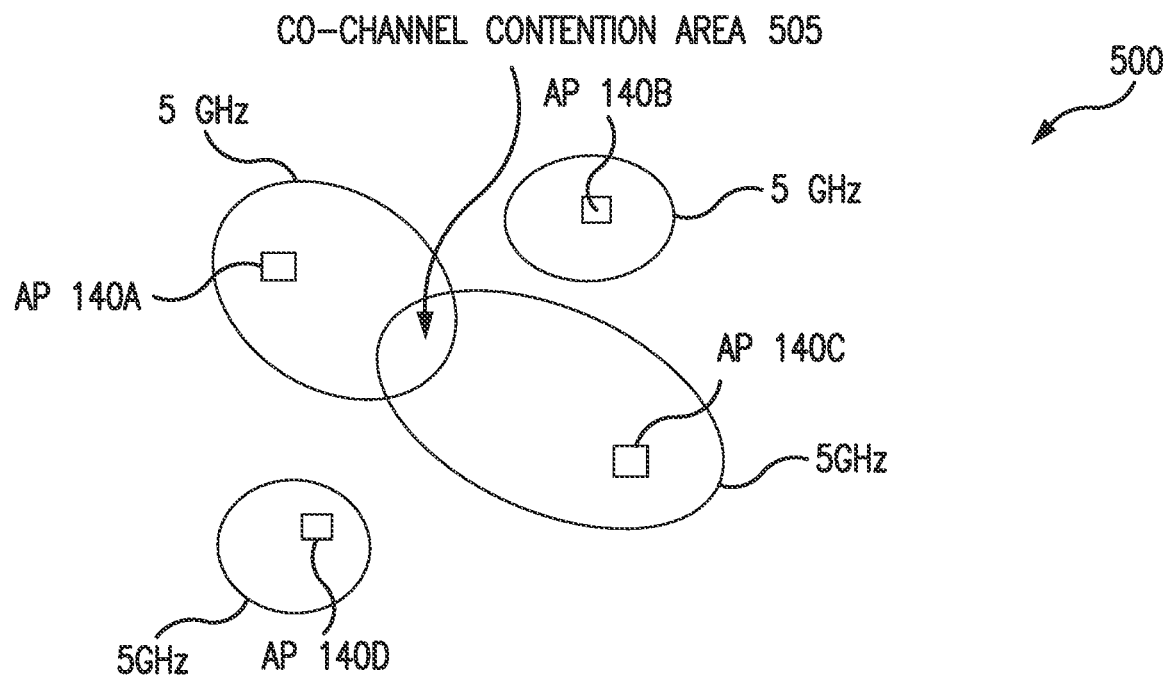
FIG. 5 illustrates co-channel contention in the same frequency band, according to one embodiment.

At block 410, which is optional, the channel assignor performs intra-frequency band contention optimization. That is, the channel assignor identifies potential contention between the APs in a mobility area or constellation at the same frequency band. This is illustrated in FIG. 5 for the 5 GHz frequency band for a constellation 500 including the APs 140A-D. In this example, the AP 140A is the candidate AP. The coverage area or radius of the 5 GHz band for the AP 140A does not overlap with the coverage areas of the 5 GHz bands for the APs 140B and 140D. Thus, there is no co-channel contention between those APs. However, the coverage area for the 5 GHz band for the AP 140A does overlap with the coverage area of the 5 GHz band of the AP 140C as indicated by the co-channel contention area 505. This area 505 indicates that when a station (whether MLD or non-MLD) is in this area 505, there can be contention if the APs 140A and 140C are using the same or similar channels.

This disclosure is not limited to any particular way of performing intra-frequency band contention optimization. Any suitable optimization can be used. Further, block 410 is optional as shown by the dashed lines. However, one advantage of performing intra-frequency band contention optimization before performing inter-frequency band optimization is the channel assignor can ensure that any changes made during inter-frequency band contention optimization do not create intra-band contention.

Returning to method 400, at block 415, the channel assignor determines whether the majority of MLDs for the candidate AP are MLMR devices. This can be determined by evaluating the MLD distributions generated in method 200. For example, the channel assignor can evaluate the MLD distributions of each frequency band supported by the candidate AP to determine the total numbers of the different MLD types.

If the majority (or some set threshold) of the MLDs associated with the candidate AP according to the MLD distributions are MLMR MLDs, the method 400 proceeds to block 420 where the channel assignor assigns channels based on the frequency bands supported by the MLMR MLDs. That is, the channel assignor can perform a further inspection of the MLMR MLDs to determine the frequency bands supported by those MLDs. For example, if the channel assignor determines that a majority of the MLMR MLDs support the 5 GHz and 6 GHz bands, the channel assignor ensures that the candidate AP does not use channels that violate the minimum frequency separation requirement for MLMR MLDs. For instance, the channel assignor might not permit the candidate AP to use the UNIT-3 channel in the 5 GHz band since it can conflict with the UNIT-5 channel in the 6 GHz band and vice versa, which can cause inter-frequency band contention.

Figure 6:
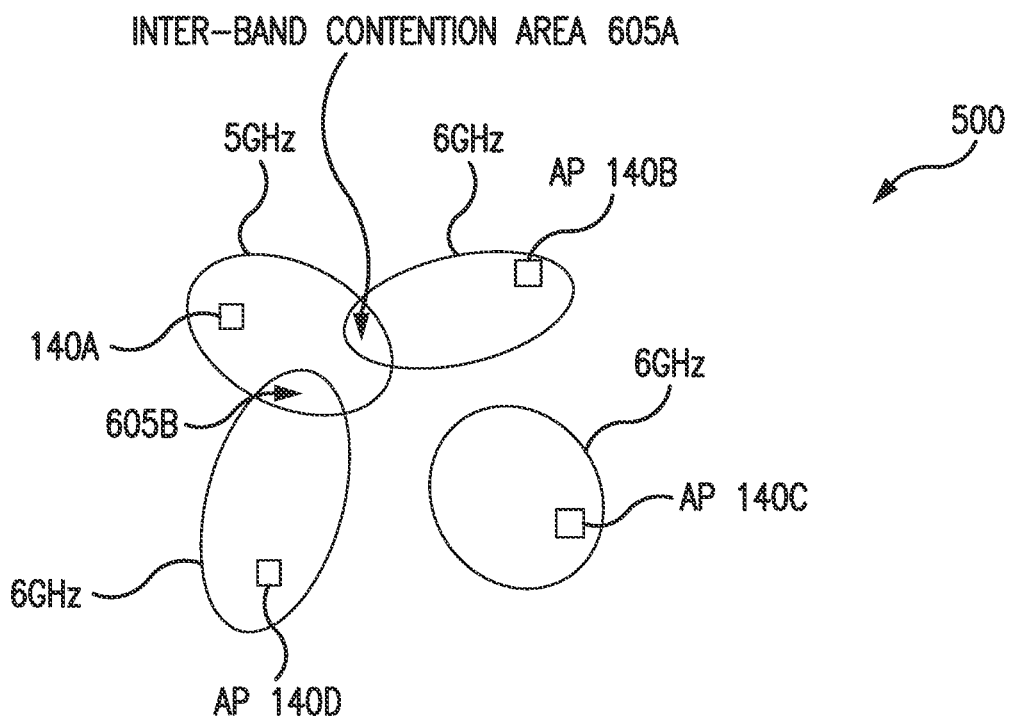
FIGS. 6 and 7 illustrate areas of inter-frequency band contention, according to one embodiment.
Figure 7:
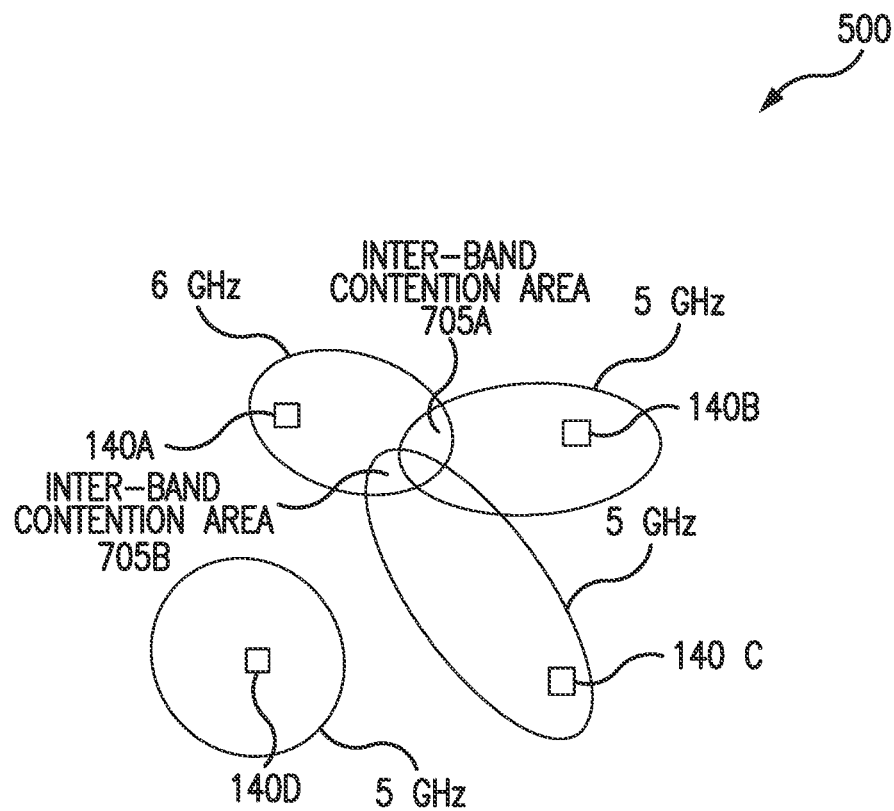

FIGS. 6 and 7 illustrate areas of inter-frequency band contention, according to one embodiment. FIG. 6 illustrates the same AP constellation 500 as shown in FIG. 5. However, instead of illustrating the coverage areas for the same frequency band (e.g., 5 GHz) for the APs 140, FIG. 6 illustrates the coverage area of the 5 GHz band for the AP 140A (e.g., the candidate AP) but the coverage areas of the 6 GHz band for the APs 140B-D.

In this example, the coverage areas for the AP 140A and the AP 140C do not overlap, and thus, cannot experience inter-frequency band contention. However, the coverage area of the AP 140A does overlap with the 6 Ghz coverage areas of the APs 140B and 140D as shown by the inter-band frequency contention areas 605A and 605B. In those areas 605, an MLD device may have a 5 GHz link to the AP 140A and a 6 GHz link to one of the APs 140B or 140D. If there is not sufficient frequency isolation between the channels used for those two links to the two different APs, there can be interference that degrades performance of the MLDs.

In response, the channel assignor can ensure that the APs 140A, 140B, and 140D uses channels in the 5 GHz and 6 GHz so that inter-band frequency contention does not occur. However, according to at least FIG. 6, the APs 140A and 140D could be assigned channels that violate the minimum frequency separation requirement since their coverage areas do not overlap, although other frequency bands may overlap for these APs as described below.

FIG. 7 illustrates the same AP constellation 500 as shown in FIGS. 5 and 6. However, FIG. 7 illustrates the coverage area of the 6 GHz band for the AP 140A (e.g., the candidate AP) but the coverage areas of the 5 GHz bands for the APs 140B-D.

In this example, the coverage areas for the AP 140A and the AP 140D do not overlap, and thus, cannot experience inter-frequency band contention. However, the 6 GHz coverage area of the AP 140A does overlap with the 5 Ghz coverage areas of the APs 140B and 140C as shown by the inter-band contention areas 705A and 705B. In these areas 705, an MLD device may have a 6 GHz link to the AP 140A and a 5 GHz link to one of the APs 140B or 140C. If there is not sufficient frequency isolation between the channels used for those two links to the two different APs, there can be interference that degrades performance of the MLDs.

Thus, FIGS. 6 and 7 illustrate that the channel assignor can ensure that the APs 140A, 140B, and 140D uses channels in the 5 GHz and 6 GHz so that inter-band contention does not occur. By evaluating both frequency bands of the candidate AP, the channel assignor can identify all possible inter-band contention scenarios such as shown here where in FIG. 6 there was not contention between the AP 140A and the AP 140C, but in FIG. 7 there is possible contention. The channel assignor can use this information to ensure there is no contention—e.g., not assigning channels to the AP 140A in the 5 GHz band that are within the minimum frequency separation of channels in the 6 GHz band and vice versa.

Further, the channel assignor may determine whether some of the MLMR MLDs require greater frequency isolation than others. For example, some MLMR MLDs may require an isolation of 100 MHz while others require 200 MHz. This may mean that some channel combinations in the 5 GHz and 6 GHz bands may cause inter-band contention for MLDs with higher isolation requirements but would not cause inter-band contention for MLDs with lower isolation requirements. To ensure suitable performance for all the MLMR MLDs, the channel assignor may use the greatest frequency isolation of the MLDs to assign the channels.

In contrast, if at block 420 the channel assignor determines the majority of MLMR MLDs support the 2.4 GHz band and the 5 GHz band (or the 6 GHz band), the channel assignor might not limit channel assignment since no channel in the 2.4 GHz band is within the minimum frequency separation requirement of any channel in the 5 GHz band or the 6 GHz band. In that case, channel assignment may be based only on the intra-frequency band contention optimization performed at block 410.

Returning to block 415, if the majority of MLDs are not MLMR MLDs, the method proceeds to block 425 to determine whether the majority (or some set threshold) of MLDs are MLSR MLDs. If so, the method 400 proceeds to block 430 where the channel assignor assigns channels based on the band-pass filter roll off factor of the MLSR MLDs. The MLSR MLDs may have different roll off factors, so the channel assignor may use the roll off factor with the greatest frequency isolation when assigning the channels.

The channel assignor may use a similar analysis as shown in FIGS. 6 and 7 to determine whether there are areas of inter-band contention between the candidate AP and other APs in the same constellation. If so, the channel assignor can assign channels to ensure the roll off factor of the MLMR MLDs are not violated in case they roam to the inter-band contention areas.

Returning to block 425, if the majority of MLDs are not MLSR MLDs, the method 400 proceeds to block 435 to determine whether the majority (or some set threshold) of the MLDs are MBCB or MBA MLDs. If so, at block 440 the channel assignor assigns channels based on frequency isolation to support multi-band channel bonding. That is, MBCB or MBA MLD may require frequency isolation when bonding channels in different frequency bands. The channel assignor can ensure this isolation is met when assigning the channels. Notably, the isolation can also be required when bonding channels in the same frequency band (i.e., intra-band channel bonding). The channel assignor can assign channels based on this consideration at block 450.

In sum, blocks 415-440 illustrate that the MLD distributions can be used to determine different techniques for assigning channels to reduce inter-band contention based on the type and numbers of MLDs in the MLD distributions for a candidate AP. However, if one type of MLD is not the majority (e.g., there is a tie), the method 400 proceeds to block 445 where the channel assignor assigns channels considering both MLMR and MLSR devices. For example, candidate APs and their adjacencies that have the same (or very close) number of the MLMR and MLSR MLDs can be evaluated to determine a frequency isolation constraint for both types of devices. In one embodiment, the channel assignor considers the minimum channel separation for a given signal to interference and noise ratio (SiNR). Some MLSR devices mandate minimal frequency separation to guarantee signal reception for a given SiNR, but the SiNR depends on the proximity of the MLD station to the candidate AP. The channel assignor can evaluate the RSSI of the MLSR MLDs and use, e.g., a lookup table to determine the minimum frequency separation required at the SiNR corresponding to the measured RSSI. The result may be a frequency separation requirement that is less than the frequency separation requirement for the MSMR MLDs, in which case the channel assignor uses the minimum frequency separation requirement of the MSMR MLDs. But if the frequency separation requirement for the MLSR MLDs (due to being further from the AP) is greater than the frequency separation requirement for the MSMR MLDs, the channel assignor uses the frequency separation requirement of the MLSR MLDs to assign the channels.

Notably, block 445 is also performed after blocks 420 and 430. For example, after performing block 420 where the channels are assigned using the frequency isolation of the MLMR MLDs, at block 445 the channel assignor may determine the percentage of the MLMR MLDs versus the MLSR MLDs associated with the candidate AP according to the ML distributions. If the percentages are close (e.g., within a threshold), the method 400 may perform block 445 to evaluate the frequency channel separation based on SiNR and determine whether the channel assignments should be reevaluated as discussed above. If at block 445 the channel assignor determines the percentages are not close, the channel assignor may not reevaluate the channel assignments that were made at block 420.

A similar analysis can be performed after block 430, but instead of determining the percentages between the MLMR and MLSR MLDs, the channel assignor can determine whether the frequency isolation constraint used at block 430 to assign the channels should be changed based on the SiNR and the proximity of the MLSR MLDs to the AP. If so, the channel assignments made at block 430 may be changed.

At block 450, the channel assignor performs intra-frequency band channel assignments for the MLDs with multiple links in the same frequency band. That is, the MLD distributions can also be used to identify MLD stations that support multiple links with the same frequency band and assign channels so that the frequency isolation constraints of the MLD stations are not violated. Thus, the information in the MLD distributions permit the channel assignor to perform both inter- and intra-band channel assignment for MLD stations to satisfy their frequency isolation constraints.

Further, as mentioned above the isolation requirements when bonding channels in the same frequency band (i.e., intra-band channel bonding) for MBCM and MBA MLDs can be used to assign channel at block 450, which can be based on MBCB and MBA distributions within the MLD distributions discussed above. Thus, the method 400 can consider frequency isolation constraints for both intra- and inter-band channel bonding when assigning channels to the MLD stations.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A system, comprising:
a processor; and
memory configured to store a program that performs an operation, the operation comprising:
identifying types of a plurality of multi-link devices (MLDs) associated with a plurality of access points (APs);
generating, for each of the plurality of APs, a plurality of MLD distributions for multiple frequency bands supported by the AP, wherein each of the plurality of MLD distributions indicate a type of each of the plurality of MLDs associated with a respective one of the plurality of APs on a respective frequency band; and
assigning channels to the plurality of MLDs for a candidate AP based on the plurality of MLD distributions and a frequency separation constraint to mitigate inter-band frequency contention.

2. The system of claim 1, the operation further comprising, before assigning channels to the plurality of MLDs for a candidate AP to mitigate inter-band frequency contention:
assigning channels to mitigate intra-frequency band contention between neighboring APs of the candidate AP configured to use a same frequency band.

3. The system of claim 1, wherein the frequency separation constraint enables make-before-break roaming (MBBR) for the plurality of MLDs.

4. The system of claim 1, wherein the types of the plurality of MLDs comprises multi-link multi radio (MLMR) devices, multi-link single radio (MLSR) devices, simultaneous transmit and receive (STR) devices and non-STR (nSTR) devices.

5. The system of claim 4, the operation further comprising:
determining that a majority of the MLDs associated with the candidate AP are MLMR devices,
wherein assigning the channels to the plurality of MLDs is based on a minimal frequency separation between two links for the MLMR devices.

6. The system of claim 4, the operation further comprising:
determining that a majority of the MLDs associated with the candidate AP are MLSR devices,
wherein assigning the channels to the plurality of MLDs is based on a band-pass filter roll off factors for the MLSR devices.

7. The system of claim 1, the operation further comprising:
identifying a portion of the plurality of MLDs associated with the candidate AP having multiple links in a same frequency band; and
performing intra-frequency band channel assignment to satisfy the frequency separation constraint for the portion of the plurality of MLDs.

8. A system, comprising:
a processor; and
memory configured to store a program that performs an operation, the operation comprising:
identifying types of a plurality of multi-link devices (MLDs) associated with a plurality of access points (APs);
generating, for each of the plurality of APs, an MLD distribution for a frequency band, wherein each of the MLD distributions indicates a type of each of the plurality of MLDs associated with a respective one of the plurality of APs on the frequency band; and
assigning channels to the plurality of MLDs in the frequency band based on the MLD distributions of the plurality of APs to satisfy intra-band spectrum isolation values in the frequency band.

9. The system of claim 1, the operation further comprising:
generating, for each of the plurality of APs, a plurality of MLD distributions for a plurality of frequency bands supported by the AP; and
assigning channels to the plurality of MLDs for a candidate AP based on the plurality of MLD distributions and a frequency separation constraint to mitigate inter-band frequency contention.

10. The system of claim 9, wherein the frequency separation constraint enables make-before-break roaming (MBBR) for the plurality of MLDs.

11. The system of claim 9, the operation further comprising:
determining that a majority of the MLDs associated with the candidate AP are MLMR devices,
wherein assigning the channels to the plurality of MLDs is based on a minimal frequency separation between two links for the MLMR devices.

12. The system of claim 9, the operation further comprising:
identifying a portion of the plurality of MLDs associated with the candidate AP having multiple links in a same frequency band; and
performing intra-frequency band channel assignment to satisfy the frequency separation constraint for the portion of the plurality of MLDs.

13. The system of claim 8, wherein the types of the plurality of MLDs comprises multi-link multi radio (MLMR) devices, multi-link single radio (MLSR) devices, simultaneous transmit and receive (STR) devices and non-STR (nSTR) devices.

14. A system, comprising:
a processor; and
memory configured to store a program that performs an operation, the operation comprising:

identifying multi-band channel bonding (MBCB) and multi-band aggregation (MBA) devices associated with a plurality of access points (APs);

generating, for each of the plurality of APs, MBCB and MBA distributions, wherein the MBCB and MBA distributions indicate a number of the MBCB and MBA devices associated with a respective one of the plurality of APs; and assigning channels to the MBCB and MBA devices based on the MBCB and MBA distributions to satisfy a frequency separation constraint for channel bonding.

15. The system of claim 14, wherein assigning channels to the MBCB and MBA devices is performed on a same frequency band.

16. The system of claim 14, wherein the assigning channels to the MBCB and MBA devices is performed across multiple frequency bands.

17. The system of claim 14, the operation further comprising:

generating, for each of the plurality of APs, a plurality of MLD distributions for multiple frequency bands supported by the AP, wherein the plurality of MLD distributions comprises the MBCB and MBA distributions and indicate a type of other types of MLDs associated with a respective one of the plurality of APs on a respective frequency band; and assigning channels to the other types of MLDs for a candidate AP based on the plurality of MLD distributions and a frequency separation constraint to mitigate inter-band frequency contention.

18. The system of claim 17, wherein the frequency separation constraint enables make-before-break roaming (MBBR) for the plurality of MLDs.

19. The system of claim 17, wherein the other types of the MLDs comprises multi-link multi radio (MLMR) devices, multi-link single radio (MLSR) devices, simultaneous transmit and receive (STR) devices and non-STR (nSTR) devices.

20. The system of claim 19, the operation further comprising:

determining that a majority of the MLDs associated with the candidate AP are MLMR devices, wherein assigning the channels to the plurality of MLDs is based on a minimal frequency separation between two links for the MLMR devices.

\* \* \* \* \*